US012217920B2

(12) United States Patent
Shamseldin et al.

(10) Patent No.: US 12,217,920 B2
(45) Date of Patent: Feb. 4, 2025

(54) SWITCHGEAR WITH OVERMOLDED DIELECTRIC MATERIAL

(71) Applicant: G & W ELECTRIC COMPANY, Bolingbrook, IL (US)

(72) Inventors: Elhanafi A. Shamseldin, Naperville, IL (US); Janet Ache, Bolingbrook, IL (US); Blair S. Kerr, Downers Grove, IL (US); Nenad Uzelac, St. John, IN (US)

(73) Assignee: G & W ELECTRIC COMPANY, Bolingbrook, IL (US)

( * ) Notice: Subject to any disclaimer, the term of this patent is extended or adjusted under 35 U.S.C. 154(b) by 205 days.

(21) Appl. No.: 17/606,367

(22) PCT Filed: Apr. 24, 2020

(86) PCT No.: PCT/US2020/029841
§ 371 (c)(1),
(2) Date: Oct. 25, 2021

(87) PCT Pub. No.: WO2020/219899
PCT Pub. Date: Oct. 29, 2020

(65) Prior Publication Data

US 2022/0216022 A1 Jul. 7, 2022

Related U.S. Application Data

(60) Provisional application No. 62/839,278, filed on Apr. 26, 2019, provisional application No. 62/899,577, filed on Sep. 12, 2019.

(51) Int. Cl.
*H01H 33/662* (2006.01)
*H01H 33/666* (2006.01)

(52) U.S. Cl.
CPC .... *H01H 33/66207* (2013.01); *H01H 33/666* (2013.01); *H01H 2033/6623* (2013.01)

(58) Field of Classification Search
CPC ........... H01H 33/66207; H01H 33/666; H01H 33/027; H01H 33/6606; H01H 33/6662;
(Continued)

(56) References Cited

U.S. PATENT DOCUMENTS

| | | | |
|---|---|---|---|
| 972,048 | A | 10/1910 | York |
| 2,140,371 | A | 12/1938 | Joseph et al. |

(Continued)

FOREIGN PATENT DOCUMENTS

| | | | |
|---|---|---|---|
| CN | 2809846 | Y | 8/2006 |
| CN | 101290846 | B | 8/2011 |

(Continued)

OTHER PUBLICATIONS

International Preliminary Report on Patentability for Application No. PCT/US2020/029841 dated Nov. 21, 2021 (10 pages).

(Continued)

*Primary Examiner* — William A Bolton
(74) *Attorney, Agent, or Firm* — Michael Best & Friedrich LLP

(57) ABSTRACT

A switchgear apparatus configured for operation at voltages up to 72.5 kV includes a vacuum interrupter assembly including a vacuum bottle having an upper portion and a lower potion, a sleeve surrounding the vacuum bottle, a dielectric material surrounding the sleeve, a first terminal electrically coupled to the upper portion of the vacuum interrupter assembly, and an interchange coupled to a lower portion of the vacuum interrupter assembly. The dielectric material is molded around the sleeve and around at least a portion of the first terminal or the interchange. The sleeve
(Continued)

may be molded around the vacuum bottle or pre-formed and slid around the vacuum bottle.

20 Claims, 4 Drawing Sheets

(58) Field of Classification Search
CPC . H01H 2033/6623; H01H 2033/66223; H02B 13/01; H02B 13/0352; H02B 13/0354; H02B 13/045
USPC ................................. 218/139, 134, 138, 155
See application file for complete search history.

(56) References Cited

U.S. PATENT DOCUMENTS

| | | | |
|---|---|---|---|
| 2,875,381 A | 2/1959 | Chabala | |
| 3,320,377 A | 5/1967 | Yonkers | |
| 3,956,721 A | 5/1976 | Link | |
| 4,124,790 A | 11/1978 | Kumbera et al. | |
| 4,283,610 A | 8/1981 | Date et al. | |
| 4,527,028 A | 7/1985 | Luehring | |
| 4,568,804 A | 2/1986 | Luehring | |
| 4,880,947 A | 11/1989 | Fey et al. | |
| 4,950,854 A | 8/1990 | Green | |
| 5,004,877 A | 4/1991 | Yin | |
| 5,091,616 A | 2/1992 | Ramos et al. | |
| 5,175,403 A | 12/1992 | Hamm et al. | |
| 5,321,221 A | 6/1994 | Rozier | |
| 5,597,992 A * | 1/1997 | Walker | H01H 33/6606 218/138 |
| 5,753,876 A | 5/1998 | Lanning | |
| 5,808,258 A * | 9/1998 | Luzzi | H01H 33/66207 218/138 |
| 5,834,725 A | 11/1998 | Clarke et al. | |
| 5,912,604 A | 6/1999 | Harvey et al. | |
| 6,130,394 A * | 10/2000 | Hogl | H01H 33/66207 218/138 |
| 6,198,062 B1 | 3/2001 | Mather et al. | |
| 6,268,579 B1 | 7/2001 | Kajiwara et al. | |
| 6,888,086 B2 * | 5/2005 | Daharsh | H01H 33/662 218/138 |
| 6,989,498 B1 | 1/2006 | Linder et al. | |
| 7,053,327 B2 | 5/2006 | Benk et al. | |
| 7,215,228 B2 * | 5/2007 | Rhein | H01H 33/6662 335/197 |
| 7,488,916 B2 | 2/2009 | Muench et al. | |
| 7,563,161 B2 | 7/2009 | Perret et al. | |
| 7,772,515 B2 | 8/2010 | Stoving et al. | |
| 8,035,054 B2 | 10/2011 | Ozawa et al. | |
| 8,178,812 B2 | 5/2012 | Martin et al. | |
| 8,269,130 B2 | 9/2012 | Mangan et al. | |
| 8,272,127 B2 | 9/2012 | Kowalyshen et al. | |
| 8,378,242 B2 | 2/2013 | Kim | |
| 8,674,254 B2 * | 3/2014 | Borgstrom | H01H 33/42 218/136 |
| 8,729,416 B2 | 5/2014 | Bullock et al. | |
| 8,772,666 B2 | 7/2014 | Darko et al. | |
| 8,785,802 B2 * | 7/2014 | Shang | H01H 33/66207 218/120 |
| 8,796,570 B2 | 8/2014 | Kobayashi et al. | |
| 8,933,358 B2 | 1/2015 | Yang | |
| 9,070,517 B2 | 6/2015 | Bullock et al. | |
| 9,177,742 B2 | 11/2015 | Ache et al. | |
| 9,190,231 B2 * | 11/2015 | Borgstrom | H01H 33/662 |
| 9,208,962 B2 | 12/2015 | Bose et al. | |
| 9,275,807 B2 | 3/2016 | Darko et al. | |
| 9,543,081 B2 | 1/2017 | Ozil et al. | |
| 9,633,802 B2 | 4/2017 | Chapelle et al. | |
| 9,633,807 B2 | 4/2017 | Ache et al. | |
| 9,640,350 B2 | 5/2017 | Stoving et al. | |
| 9,659,728 B2 | 5/2017 | Martin et al. | |
| 9,685,280 B2 | 6/2017 | Benson et al. | |
| 9,685,283 B2 | 6/2017 | Darko et al. | |
| 9,953,772 B2 | 4/2018 | Korves et al. | |
| 10,074,496 B2 | 9/2018 | Lamara et al. | |
| 10,115,547 B2 | 10/2018 | Gerovac et al. | |
| 2001/0025829 A1 | 10/2001 | Marin-pache et al. | |
| 2005/0082260 A1 | 4/2005 | Martin et al. | |
| 2006/0231529 A1 | 10/2006 | Daharsh et al. | |
| 2008/0087647 A1 * | 4/2008 | Volkmar | H01H 33/66207 218/134 |
| 2010/0000972 A1 | 1/2010 | Bodenstein et al. | |
| 2010/0089874 A1 | 4/2010 | Morita et al. | |
| 2010/0276395 A1 | 11/2010 | Gardner | |
| 2012/0261384 A1 | 10/2012 | Labianco et al. | |
| 2013/0187732 A1 | 7/2013 | Bullock et al. | |
| 2014/0138357 A1 | 5/2014 | Kasza et al. | |
| 2015/0221464 A1 * | 8/2015 | Gentsch | H01H 33/6606 200/293 |
| 2015/0262768 A1 | 9/2015 | Siebens et al. | |
| 2015/0311009 A1 | 10/2015 | Ding et al. | |
| 2015/0332883 A1 | 11/2015 | Benke | |
| 2016/0005560 A1 | 1/2016 | Ache et al. | |
| 2016/0012994 A1 | 1/2016 | Boffelli et al. | |
| 2016/0126037 A1 | 5/2016 | Gerovac et al. | |
| 2016/0141117 A1 | 5/2016 | Ashteka et al. | |
| 2017/0207039 A1 * | 7/2017 | Pohle | H01H 33/66207 |
| 2019/0259554 A1 | 8/2019 | Hillmann | |

FOREIGN PATENT DOCUMENTS

| | | | |
|---|---|---|---|
| CN | 206135272 | U | 4/2017 |
| CN | 109449042 | A | 3/2019 |
| EP | 1120804 | A1 | 8/2001 |
| EP | 1482528 | A2 | 12/2004 |
| EP | 1811536 | A1 | 7/2007 |
| EP | 2859567 | B1 | 8/2018 |
| GB | 391771 | A | 4/1933 |
| JP | 3969344 | B2 | 9/2007 |
| WO | WO1990001788 | A1 | 2/1990 |
| WO | WO2000041199 | A1 | 7/2000 |
| WO | WO2002069352 | A1 | 9/2002 |
| WO | WO2009098122 | A1 | 8/2009 |
| WO | WO2010058025 | A1 | 5/2010 |
| WO | WO2011075931 | A1 | 6/2011 |
| WO | 2013187886 | A2 | 12/2013 |
| WO | WO2019133611 | A1 | 7/2019 |

OTHER PUBLICATIONS

International Search Report and Written Opinion for Application No. PCT/US2020/029841 dated Aug. 14, 2020 (13 pages).
International Preliminary Report on Patentability for Application No. PCT/US2020/029850 dated Nov. 4, 2021 (7 pages).
International Search Report and Written Opinion for Application No. PCT/US2020/029850 dated Aug. 14, 2020 (10 pages).
International Preliminary Report on Patentability for Application No. PCT/US2020/029865 dated Nov. 4, 2021 (7 pages).
International Search Report and Written Opinion for Application No. PCT/US2020/029865 dated Aug. 14, 2020 (11 pages).
International Preliminary Report on Patentability for Application No. PCT/US2020/029868 dated Nov. 4, 2021 (7 pages).
International Search Report and Written Opinion for Application No. PCT/US2020/029868 dated Aug. 14, 2020 (10 pages).
G&W Electric, "Viper-ST," Catalog O-vst14, dated Nov. 2014 (12 pages).
G&W Electric, "Viper-SP," Catalog VSP10, dated Jun. 2010 (8 pages).
European Office Extended European Search Report for application 20796401.6, dated Dec. 12, 2022 (8 pages).
European Patent Office Action for Application 20796401.6, dated Jul. 1, 2024 (8 pages).
Colombian Patent Office. Office Action for Application No. NC2021/0014145 dated Oct. 23, 2024 (20 pages with machine translation).

* cited by examiner

SWITCHGEAR WITH OVERMOLDED DIELECTRIC MATERIAL

CROSS-REFERENCE TO RELATED APPLICATIONS

This application is a national phase entry pursuant to 35 U.S.C § 371 of International Patent Application No. PCT/US2020/029841, filed on Apr. 24, 2020, which claims priority to U.S. Provisional Patent Application No. 62/839,278, filed on Apr. 26, 2019, and to U.S. Provisional Patent Application No. 62/889,577, filed on Sep. 12, 2019, the entire contents of all of which are incorporated herein by reference.

FIELD OF THE DISCLOSURE

The present disclosure relates to solid dielectric switchgear, and more particularly to reclosers.

BACKGROUND OF THE DISCLOSURE

Reclosers are switchgear that provide line protection, for example, on overhead electrical power lines and/or substations and serve to segment the circuits into smaller sections, reducing the number of potentially impacted customers in the event of a short circuit. Previously, reclosers were controlled using hydraulics. More recently, solid dielectric reclosers have been developed for use at voltages up to 38 kV. Solid dielectric reclosers may be paired with electronic control devices to provide automation and "smart" recloser functionality.

SUMMARY OF THE DISCLOSURE

A need exists for fault protection and circuit segmentation in power transmission circuits, which typically operate at higher voltages (e.g., up to 1,100 kV). Reclosers allow for multiple automated attempts to clear temporary faults on overhead lines. In power transmission systems, this function is typically achieved using circuit breakers in substations. The present disclosure provides switchgear in the form of a recloser that can operate at voltages up to 72.5 kV. In some embodiments, the switchgear according to the present disclosure includes a vacuum interrupter assembly with a vacuum bottle and a sleeve over the vacuum bottle that allows for a more consistent seal when molding a dielectric material about the vacuum interrupter assembly (i.e., an overmold).

By providing a more consistent overmold, the present disclosure advantageously provides better over-current protection with reduced degradation over time, which provides better protection against arcing over the contacts of the vacuum interrupter. For example, the sleeve may help keep the dielectric material used in an overmolding process from entering gaps and/or cracks that may be present within and/or between components of the vacuum assembly. This reduces the number of customers or end users impacted by a potential fault and therefore improves the power transmission system's reliability.

The present disclosure provides, in one aspect, a switchgear apparatus configured for operation at voltages up to 72.5 kV, the switchgear apparatus including a vacuum interrupter assembly including a vacuum bottle having an upper portion and a lower potion, a sleeve surrounding the vacuum bottle, a dielectric material surrounding the sleeve, a first terminal electrically coupled to the upper portion of the vacuum interrupter assembly, and an interchange coupled to a lower portion of the vacuum interrupter assembly. The dielectric material is molded around the sleeve and around at least a portion of the first terminal or the interchange. In some embodiments, the sleeve is molded around the vacuum bottle. In other embodiments, the sleeve may be otherwise positioned (i.e., by sliding a pre-formed sleeve) around the vacuum bottle.

The present disclosure provides, in another aspect, a switchgear apparatus configured for operation at voltages up to 72.5 kV, the switchgear apparatus including a vacuum interrupter assembly including a vacuum bottle having an upper portion and a lower potion, and a fixed contact and a movable contact hermetically sealed within the vacuum bottle. The switchgear apparatus further includes a first terminal electrically coupled to fixed contact at the upper portion of the vacuum bottle, an interchange coupled to the movable contact at the lower portion of the vacuum bottle, a conductor electrically coupled to the interchange, a second terminal electrically coupled to the conductor, and a sensor assembly associated with the conductor. The sensor assembly includes at least one of a voltage sensor or a current sensor. An actuator assembly is operable to selectively break a conductive pathway between the first terminal and the second terminal by moving the movable contact from a closed position in which the movable contact engages the fixed contact to an open position in which the movable contact is spaced from the fixed contact. The actuator assembly includes a drive shaft configured to move the movable contact between the closed position and the open position, a magnet configured to maintain the drive shaft in a position corresponding with the closed position of the movable contact, and a dielectric material molded around the vacuum interrupter assembly.

Other aspects of the invention will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting. Also, as used herein and in the appended claims, the terms "upper," "lower," "top," "bottom," "front," "back," and other directional terms are not intended to require any particular orientation, but are instead used for purposes of description only.

Figure 1:
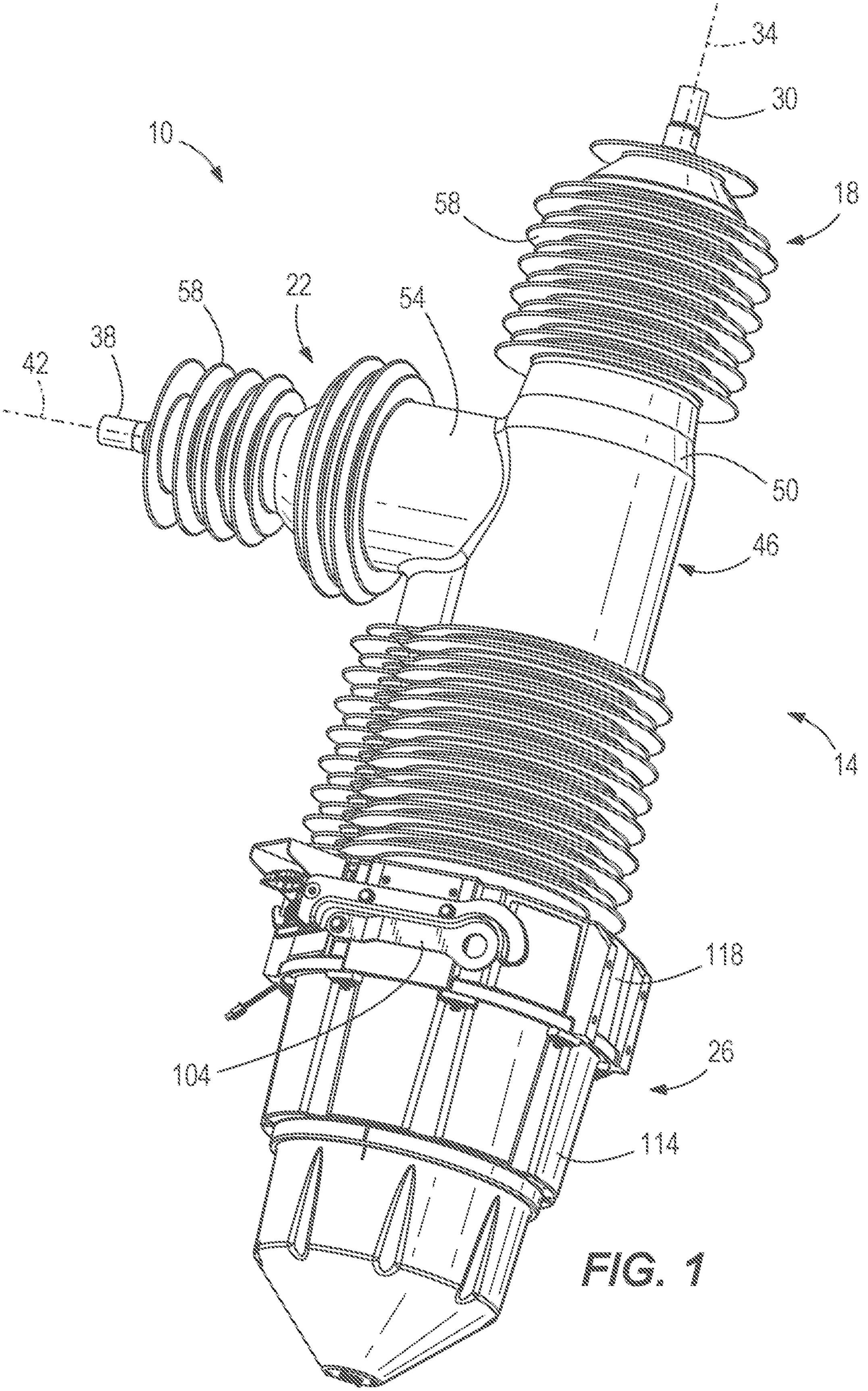
FIG. 1 illustrates a perspective view of a recloser and/or switchgear apparatus ("recloser") according to an embodiment of the present disclosure.

FIG. 1 illustrates a recloser 10 according to an embodiment of the present disclosure. The recloser 10 includes a housing assembly 14, a vacuum interrupter ("VI") assembly 18, a conductor assembly 22, which in some embodiments may be a load-side conductor assembly 22 and in other embodiments may be a source-side conductor assembly 22, and an actuator assembly 26. The VI assembly 18 includes a first terminal 30 extending from the housing assembly 14 along a first longitudinal axis 34, and the conductor assembly 22 includes a second terminal 38 extending from the housing assembly 14 along a second longitudinal axis 42 perpendicular to the first longitudinal axis 34. In other embodiments, the second longitudinal axis 42 may be obliquely oriented relative to the first longitudinal axis 34. The actuator assembly 26 may operate the VI assembly 18 to selectively break and/or reestablish a conductive pathway between the first and second terminals 30, 38. Although the recloser 10 is illustrated individually in FIG. 1, the recloser 10 may be part of a recloser system including a plurality of reclosers 10, each associated with a different phase of a three-phase power transmission system and ganged together such that operation of the plurality of reclosers 10 is synchronized.

Figure 2:
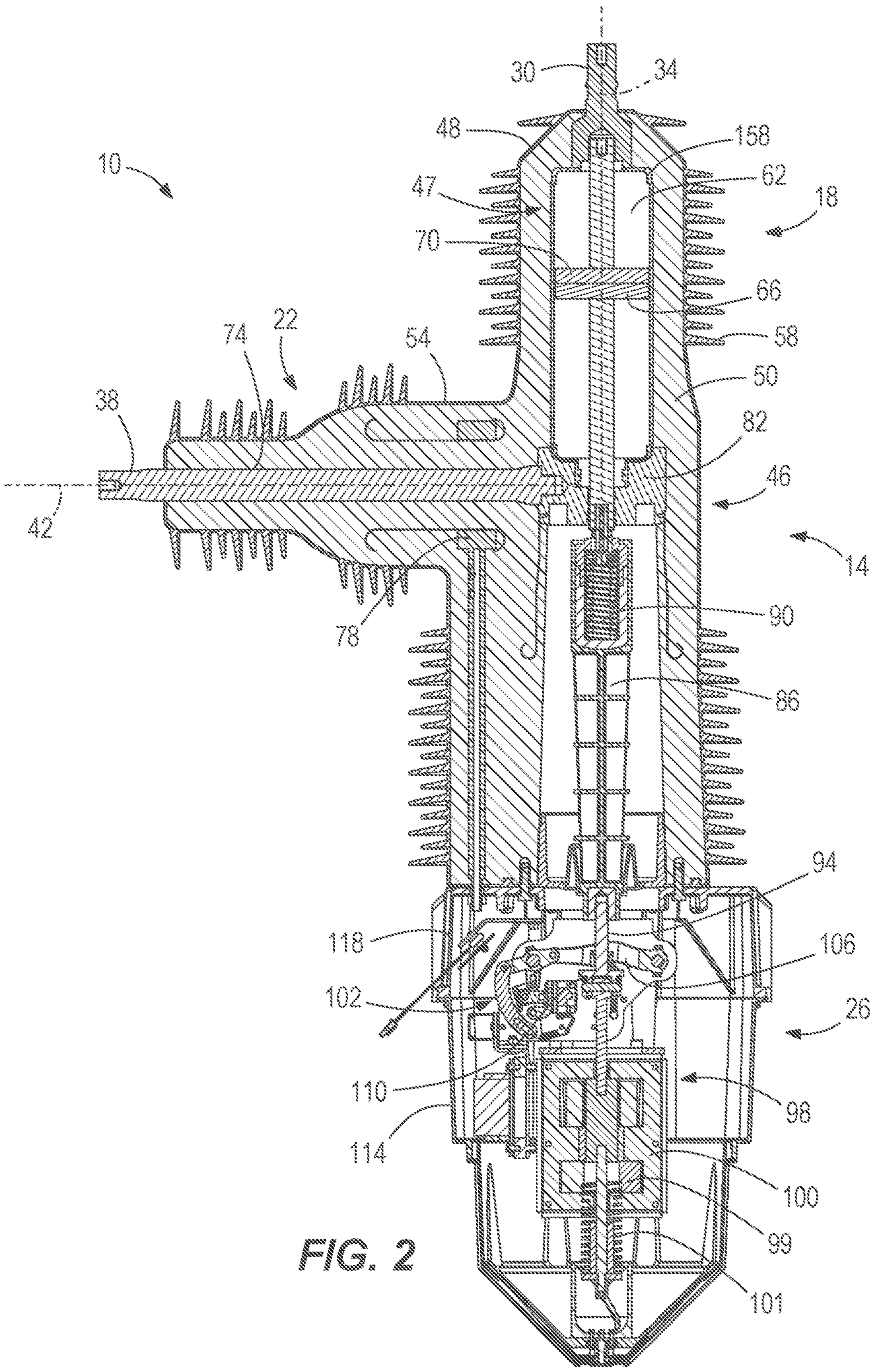
FIG. 2 illustrates a cross-sectional view of the recloser of FIG. 1.

Referring now to FIG. 2, the illustrated housing assembly 14 includes a main housing 46 with an insulating material, such as epoxy, that forms a solid dielectric module 47. The solid dielectric module 47 is preferably made of a silicone or cycloaliphatic epoxy. In other embodiments, the solid dielectric module 47 may be made of a fiberglass molding compound. In other embodiments, the solid dielectric module 47 may be made of other moldable dielectric materials. The main housing 46 may further include a protective layer 48 surrounding the solid dielectric module 47. In some embodiments, the protective layer 48 withstands heavily polluted environments and serves as an additional dielectric material for the recloser 10. In some embodiments, the protective layer 48 is made of silicone rubber that is overmolded onto the solid dielectric module 47. In other embodiments, the protective layer 48 may be made of other moldable (and preferably resilient) dielectric materials, such as polyurethane.

With continued reference to FIG. 2, the main housing 46 includes a first bushing 50 that surrounds and at least partially encapsulates the VI assembly 18, and a second bushing 54 that surrounds and at least partially encapsulates the conductor assembly 22. The silicone rubber layer 48 includes a plurality of sheds 58 extending radially outward from both bushings 50, 54. In other embodiments, the sheds 58 may be formed as part of the dielectric module 47 and covered by the silicone rubber layer 48. In yet other embodiments, the sheds 58 may be omitted. The first and second bushings 50, 54 may be integrally formed together with the dielectric module 47 of the main housing 46 as a single monolithic structure. Alternatively, the first and second bushings 50, 54 may be formed separately and coupled to the main housing 46 in a variety of ways (e.g., via a threaded connection, snap-fit, etc.).

The illustrated VI assembly 18 includes a vacuum bottle 62 at least partially molded within the first bushing 50 of the main housing 46. In some embodiments, the vacuum bottle 62 is additionally or alternatively pressed into the first bushing 50 of the main housing 46. In some embodiments, the vacuum bottle 62 is surrounded by a sleeve 158, which is preferably made of a resilient dielectric material such as silicone rubber. The vacuum bottle 62 encloses a movable contact 66 and a stationary contact 70 such that the movable contact 66 and the stationary contact 70 are hermetically sealed within the vacuum bottle 62. The movable contact 66 is maintained in contact with an interchange 82 through the use of contact bands. Contact between the moveable contact 66 and the interchange 82 may be maintained through frictional contact. In some embodiments, (i) the sleeve 158 is molded around the VI assembly 18, and includes silicone, (ii) the solid dielectric module 47 is molded around the sleeve 158, and includes an epoxy, and (iii) the silicone rubber layer 48 is molded around the solid dielectric module 47, and includes silicone. Such an embodiment including each of (i) to (iii) may be particularly advantageous in a high voltage (i.e., 72.5 kV) recloser to establish or break electrical contact within the VI assembly 18 because of the more consistent molding process provided by each of the overmolds (i) to (iii).

In some embodiments, the vacuum bottle 62 has an internal absolute pressure of about 1 millipascal or less. The movable contact 66 is movable along the first longitudinal axis 34 between a closed position (illustrated in FIG. 2) and an open position (not shown) to selectively establish or break contact with the stationary contact 70. The vacuum bottle 62 quickly suppresses electrical arcing, for example suppression may occur in less than 30 milliseconds, that may occur when the contacts 66, 70 are opened due to the lack of conductive atmosphere within the bottle 62. In some embodiments, the vacuum bottle 62 suppresses electrical arcing in a time of between about 8 milliseconds and about 30 milliseconds.

The conductor assembly 22 may include a conductor 74 and a sensor assembly 78, each at least partially molded within the second bushing 54 of the main housing 46. The sensor assembly 78 may include a current sensor, a voltage sensor, partial discharge sensor, voltage indicated sensor, and/or other sensing devices. One end of the conductor 74 is electrically coupled to the movable contact 66 via the current interchange 82. The opposite end of the conductor 74 is electrically coupled to the second terminal 38. The first terminal 30 is electrically coupled to the stationary contact 70. The first terminal 30 and the second terminal 38 are configured for connection to respective electrical power transmission lines.

With continued reference to FIG. 2, the actuator assembly 26 includes a drive shaft 86 extending through the main housing 46 and coupled at one end to the movable contact 66 of the VI assembly 18. In the illustrated embodiment, the drive shaft 86 is coupled to the movable contact 66 via an encapsulated spring 90 to permit limited relative movement between the drive shaft 86 and the movable contact 66. The encapsulated spring 90 biases the movable contact 66 toward the stationary contact 70. The opposite end of the drive shaft 86 is coupled to an output shaft 94 of an electromagnetic actuator 98. The electromagnetic actuator 98 is operable to move the drive shaft 86 along the first longitudinal axis 34 and thereby move the movable contact 66 relative to the stationary contact 70. In additional or alternative embodiments, the functionality provided by the encapsulated spring 90 may be provided with an external spring and/or a spring positioned otherwise along the drive shaft 86. For example, the spring may be instead positioned at a first end or at a second end of the drive shaft 86.

The electromagnetic actuator 98 in the illustrated embodiment includes a coil 99, a permanent magnet 100, and a spring 101. The coil 99 includes one or more copper windings which, when energized, produce a magnetic field that acts on the output shaft 94. The permanent magnet 100 is configured to hold the output shaft 94 in a position corresponding with the closed position of the movable contact 66. The spring 101 biases the output shaft 94 in an opening direction (i.e. downward in the orientation of FIG. 2). In some embodiments, the actuator assembly 26 may include other actuator configurations. For example, in some embodiments, the permanent magnet 100 may be omitted, and the output shaft 94 may be latched in the closed position in other ways. In additional or alternative embodiments, the electromagnetic actuator 98 may be omitted.

The actuator assembly 26 includes a controller (not shown) that controls operation of the electromagnetic actuator 98. In some embodiments, the controller receives feedback from the sensor assembly 78 and energizes or de-energizes the electromagnetic actuator 98 in response to one or more sensed conditions. For example, the controller may receive feedback from the sensor assembly 78 indicating that a fault has occurred. In response, the controller may control the electromagnetic actuator 98 to automatically open the VI assembly 18 and break the circuit. The controller may also control the electromagnetic actuator 98 to automatically close the VI assembly 18 once the fault has been cleared (e.g., as indicated by the sensor assembly 78).

In the exemplary illustrated embodiment, the actuator assembly 26 further includes a manual trip assembly 102 that can be used to manually open the VI assembly 18 through the operation of the drive shaft 86 and/or other linkages. The manual trip assembly 102 includes a handle 104 accessible from an exterior of the housing assembly 14 (as shown in FIG. 1). The handle 104 is rotatable to move a yoke 106 inside the housing assembly 14 (as shown in FIG. 2). The yoke 106 is engageable with a collar 110 on the output shaft 94 to move the movable contact 66 toward the open position. The illustrated housing assembly 14 includes an actuator housing 114 enclosing the electromagnetic actuator 98 and a head casting 118 coupled between the actuator housing 114 and the main housing 46. The manual trip assembly 102 is supported by the head casting 118, and the output shaft 94 extends through the head casting 118 to the drive shaft 86.

Figure 3:
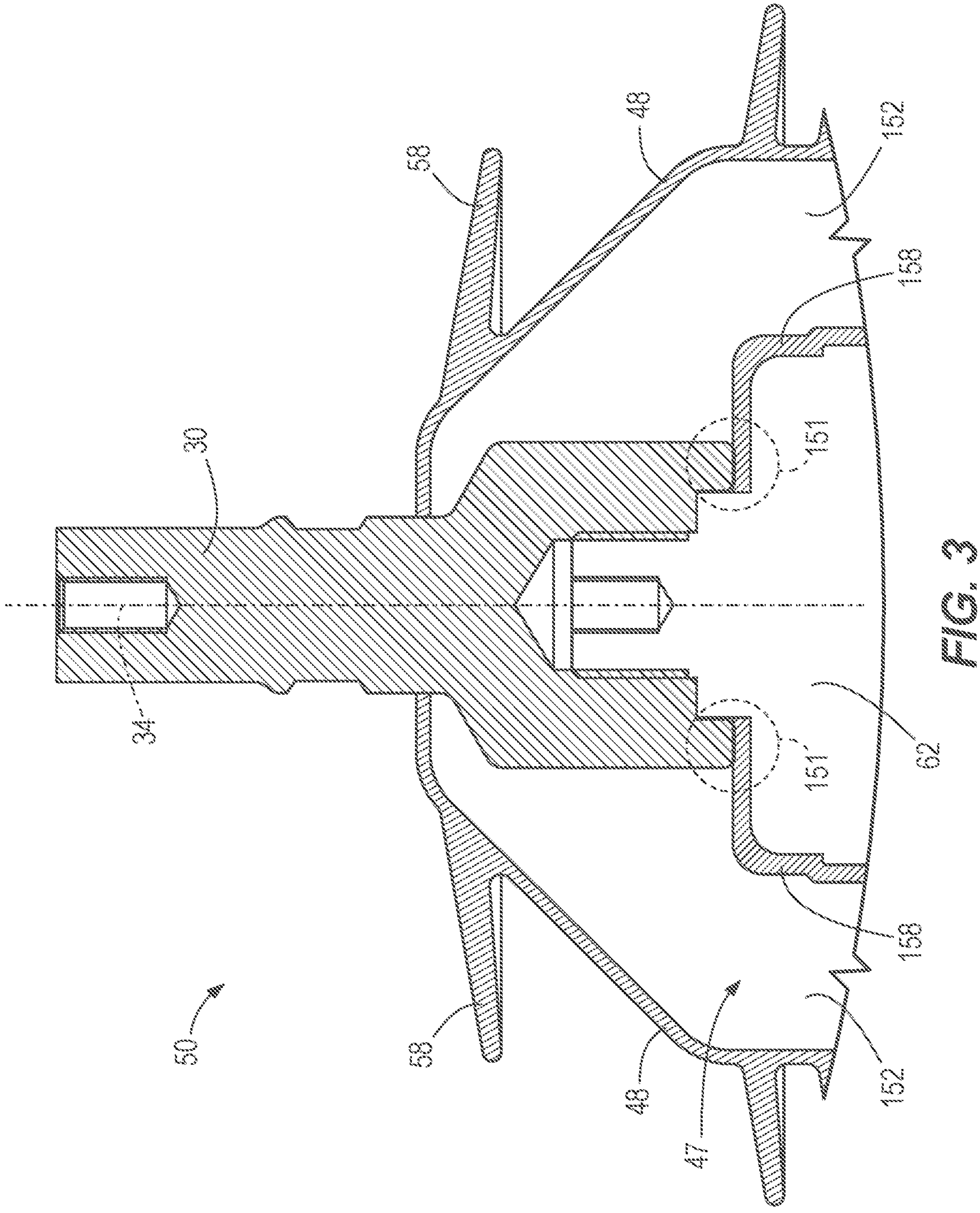
FIG. 3 illustrates a detailed, cross-sectional view of a top portion of the vacuum interrupter assembly of the recloser of FIG. 1.

Referring now to FIG. 3, a detailed, cross-sectional view of a top portion of the VI assembly 18 of the recloser 10 is shown. The sleeve 158 is shown positioned around the vacuum bottle 62. The first terminal 30 is seated against the sleeve 158 at an upper connection point 151 within the first bushing 50. The sleeve 158 is compressed between the first terminal 30 and the top of the vacuum bottle 62 to form a complete seal between the first terminal 30 and the vacuum bottle 62. In the illustrated embodiment, the upper connection point 151 between the first terminal 30 and the sleeve 158 is completely molded (i.e., entirely surrounded in molding) within dielectric material 152 of the dielectric module 47 (cross-hatching of the dielectric material 152 is omitted from FIG. 3 for the purpose of more clearly illustrating the sleeve 158). In other words, the upper connection point 151 is entirely encapsulated by the dielectric material 152.

In additional and/or alternative embodiments, a method related to the structure disclosed herein may include providing the vacuum bottle 62 and the first terminal 30, positioning the sleeve 158 about the vacuum bottle 62, positioning the first terminal 30 against a portion of the sleeve 158 surrounding an opening of the vacuum bottle 62, and compressing the portion of the sleeve 158 between the first terminal 30 and the vacuum bottle 62 to form a seal between the first terminal 30 and the vacuum bottle 62. A contact area between the sleeve 158 and the first terminal 30 is the upper connection point 151. The method may further include encapsulating at least the upper connection point 151 by molding the dielectric material 152 over at least the upper connection point 151. Such a configuration and/or method may advantageously inhibit creepage and tracking from the VI assembly 18. In some embodiments, the sleeve 158 may be compressed before, during, and/or after molding the dielectric material 152.

Figure 4:
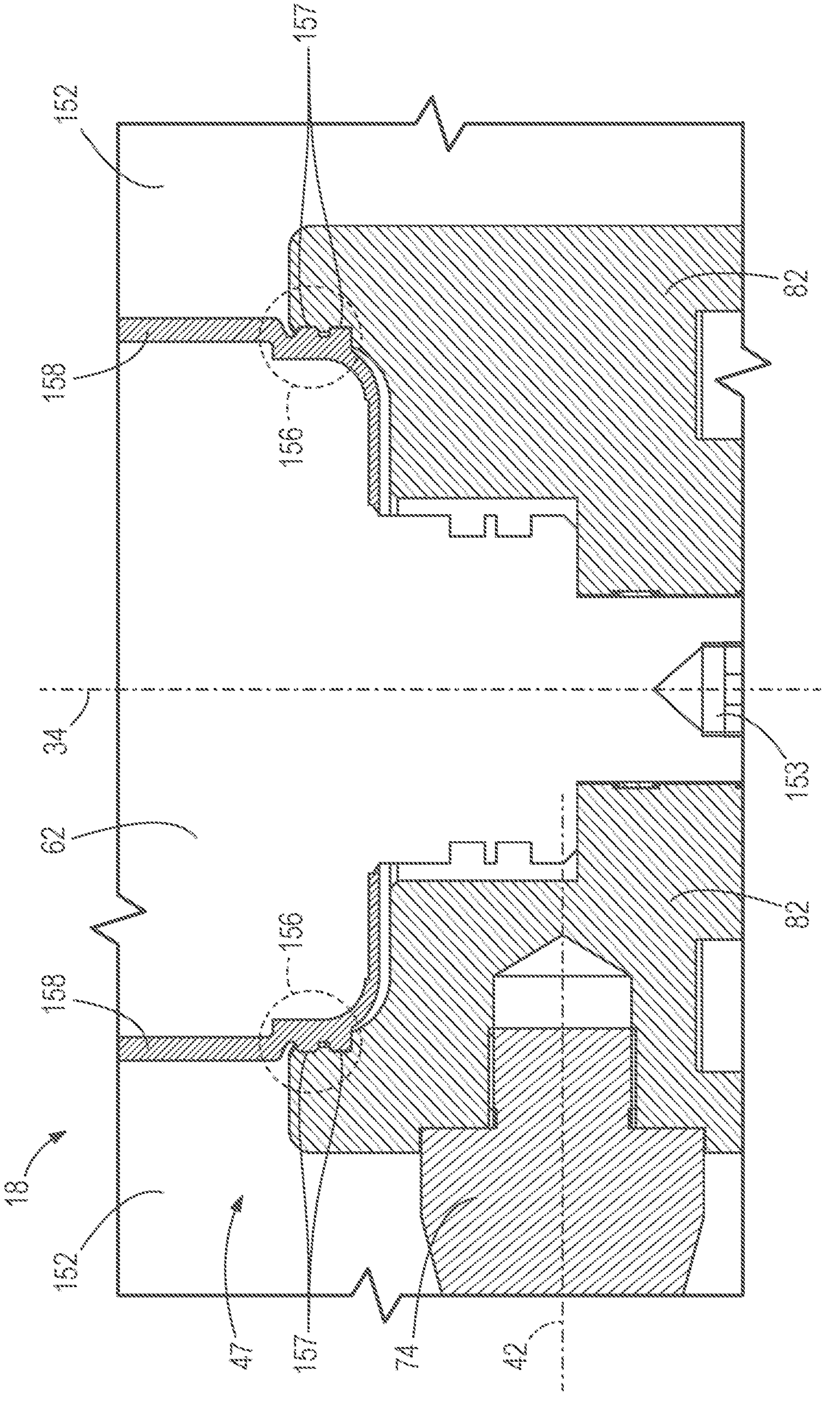
FIG. 4 illustrates a detailed, cross-sectional view of a bottom portion of the vacuum interrupter assembly of the recloser of FIG. 1.

Referring now to FIG. 4, a detailed, cross-sectional view of a bottom portion of the VI assembly 18 of the recloser 10 of FIG. 1 is illustrated. As shown, the interchange 82 is positioned to interact with an interchange terminal 153 along the first longitudinal axis 34 (and configured to connect to the movable contact 66, shown in FIG. 2) and the connector 74 along the second longitudinal axis 42. The interchange 82 connects to the sleeve 158 positioned about the vacuum bottle 62 at a lower connection point 156.

In the illustrated embodiment, the sleeve 158 includes at least one ridge 157 integrally formed with the sleeve 158 and surrounding the circumference of the sleeve 158 at the lower connection point 156. The interchange 82 may include a mating feature (e.g., one or more ridges, grooves, or the like) configured to cooperate with the ridge 157 on the sleeve 158 to form a seal between the vacuum bottle 62 and the interchange 82 at the lower connection point 156. In the illustrated embodiment, the lower connection point 156 is completely molded (i.e., entirely surrounded in molding) with the dielectric material 152 (cross-hatching of the dielectric material 152 is again omitted from FIG. 4 for the purpose of clarity). In other words, the lower connection point 156 is entirely encapsulated by the dielectric material 152.

For example, in additional and/or alternative preferred embodiments, a method related to the structure disclosed herein may include providing the vacuum bottle 62 within the sleeve 158 and the interchange 82, positioning a portion of the sleeve 158 around an opening of the vacuum bottle 62 against and/or partially within the interchange 82 such that the ridge 157 is located between the sleeve 158 and the interchange 82, and molding the dielectric material 152 over the sleeve 158 and the interchange 82. Such a configuration and/or method may advantageously prevent the dielectric material 152 (e.g., epoxy) from leaking into the connection between the vacuum bottle 62 and the interchange 82 during molding. In addition, by sealing between the vacuum bottle 62 and the interchange 82, the sleeve 158 may also inhibit creepage and tracking from the VI assembly 18 at the lower connection point 156.

An exemplary operating sequence of the recloser 10 according to certain embodiments of the present disclosure will now be described with reference to FIG. 2. During operation, the controller of the recloser 10 may receive feedback from the sensor assembly 78 indicating that a fault has occurred. In response to this feedback, the controller automatically energizes the coil 99 of the electromagnetic actuator 98. The resultant magnetic field generated by the coil 99 moves the output shaft 94 in an opening direction (i.e. downward in the orientation of FIG. 2). This movement creates an air gap between the output shaft 94 and the permanent magnet 100 that greatly reduces the holding force of the permanent magnet 100. With the holding force of the permanent magnet 100 reduced, the spring 101 is able to overcome the holding force of the permanent magnet 100 and accelerate the output shaft 94 in the opening direction. As such, the coil 99 is only required to be energized momentarily to initiate movement of the output shaft 94, advantageously reducing the power drawn by the electromagnetic actuator 98 and minimizing heating of the coil 99.

The output shaft 94 moves the drive shaft 86 in the opening direction. As the drive shaft 86 moves in the opening direction, the encapsulated spring 90, which is compressed when the contacts 66, 70 are closed, begins to expand. The spring 90 thus initially permits the drive shaft 86 to move in the opening direction relative to the movable contact 66 and maintains the movable contact 66 in fixed electrical contact with the stationary contact 70. As the drive shaft 86 continues to move and accelerate in the opening direction under the influence of the spring 101, the spring 90 reaches a fully expanded state. When the spring 90 reaches the fully expanded state, the downward movement of the drive shaft 86 is abruptly transferred to the movable contact 66. This separates the movable contact 66 from the stationary contact 70 and reduces arcing that may occur upon separating the contacts 66, 70. The movable contact may be separated in a time of between 8 milliseconds and 30 milliseconds. By quickly separating the contacts 66, 70, degradation of contacts 66, 70 due to arcing is reduced, and the reliability of the VI assembly 18 is improved.

Thus, the present disclosure provides a high voltage recloser 10 suitable for use in power transmission applications up to 72.5 kV. The VI assembly 18 quickly and reliably suppresses arcing without the need for an oil tank or a gas-filled container containing sulphur hexafluoride (SF6), which is a potent greenhouse gas. In addition, the VI assembly 18 disclosed herein is advantageously maintenance free.

Various features and advantages of the invention are set forth in the following claims.

What is claimed is:

1. A switchgear apparatus configured for operation at voltages up to 72.5 kV, the switchgear apparatus comprising:
- a vacuum interrupter assembly including a vacuum bottle having an upper portion and a lower potion;
- a sleeve surrounding the vacuum bottle;
- a dielectric material surrounding the sleeve;
- a first terminal having a first end coupled to the upper portion of the vacuum bottle and a second end configured for coupling to a power line; and
- an interchange coupled to the lower portion of the vacuum bottle,
- wherein the dielectric material is molded around the sleeve and around at least a portion of the first terminal or the interchange,
- wherein the sleeve is compressed between the first end of the first terminal and the upper portion of the vacuum bottle, and
- wherein the sleeve includes a ridge that forms a seal between the interchange and the lower portion of the vacuum bottle.

2. The switchgear apparatus of claim 1, wherein the dielectric material is molded around the sleeve, at least a portion of the first terminal, and at least a portion of the interchange.

3. The switchgear apparatus of claim 1, wherein the sleeve comprises silicone rubber.

4. The switchgear apparatus of claim 1, wherein the dielectric material comprises epoxy.

5. The switchgear apparatus of claim 4, wherein the dielectric material comprises silicone epoxy.

6. The switchgear apparatus of claim 1, further comprising a protective layer surrounding the dielectric material.

7. The switchgear apparatus of claim 6, wherein the protective layer comprises silicone rubber.

8. The switchgear apparatus of claim 6, wherein the protective layer comprises a plurality of sheds.

9. The switchgear apparatus of claim 1, wherein the vacuum interrupter assembly includes a fixed contact electrically coupled to the first terminal and a movable contact electrically coupled to the second terminal.

10. The switchgear apparatus of claim 9, further comprising an actuator assembly operable to selectively break a conductive pathway between the first terminal and the second terminal by moving the movable contact away from the fixed contact.

11. The switchgear apparatus of claim 10, wherein the actuator assembly includes an electromagnetic actuator.

12. The switchgear apparatus of claim 10, wherein the actuator assembly includes a spring actuator.

13. The switchgear apparatus of claim 10, wherein:
- the movable contact is movable between a closed position in which the movable contact is in electrical contact with the fixed contact and an open position in which the movable contact is spaced from the fixed contact,
- the actuator assembly includes a drive shaft configured to move the movable contact between the closed position and the open position, and
- the actuator assembly further includes a magnet configured to maintain the drive shaft in a position corresponding with the closed position of the movable contact.

14. The switchgear apparatus of claim 1, further comprising a conductor electrically coupled to the interchange and a sensor assembly associated with the conductor, wherein the sensor assembly includes at least one of a voltage sensor or a current sensor, and wherein the sensor assembly is molded within the dielectric material.

15. A switchgear apparatus configured for operation at voltages up to 72.5 kV, the switchgear apparatus comprising:
- a vacuum interrupter assembly including a vacuum bottle having an upper portion and a lower potion, and a fixed contact and a movable contact hermetically sealed within the vacuum bottle;
- a sleeve surrounding the vacuum bottle;
- a first terminal electrically coupled to fixed contact at the upper portion of the vacuum bottle;
- an interchange coupled to the movable contact, wherein the interchange includes a groove configured to receive a portion of the sleeve to form a seal between the interchange and the lower portion of the vacuum bottle;
- a conductor electrically coupled to the interchange;
- a second terminal electrically coupled to the conductor;
- a sensor assembly associated with the conductor, wherein the sensor assembly includes at least one of a voltage sensor or a current sensor;
- an actuator assembly operable to selectively break a conductive pathway between the first terminal and the second terminal by moving the movable contact from a closed position in which the movable contact engages the fixed contact to an open position in which the movable contact is spaced from the fixed contact, wherein the actuator assembly includes
  - a drive shaft configured to move the movable contact between the closed position and the open position, and
  - a magnet configured to maintain the drive shaft in a position corresponding with the closed position of the movable contact; and
- a dielectric material molded around the vacuum interrupter assembly.

16. The switchgear of claim 15, wherein the sensor assembly is molded within the dielectric material.

17. The switchgear of claim 16, wherein the conductor, the interchange, and at least a portion of the first terminal are molded within the dielectric material.

18. The switchgear of claim 15, further comprising a sleeve made of silicone rubber disposed between at least a portion of the vacuum interrupter assembly and the dielectric material.

19. A switchgear apparatus configured for operation at voltages up to 72.5 kV, the switchgear apparatus comprising:

a vacuum interrupter assembly including a vacuum bottle having an upper portion and a lower potion;

a sleeve surrounding the vacuum bottle;

a dielectric material surrounding the sleeve;

a first terminal electrically coupled to the upper portion of the vacuum bottle; and an interchange coupled to the lower portion of the vacuum bottle, wherein the dielectric material is molded around the sleeve and around at least a portion of the first terminal or the interchange, and wherein the sleeve includes a ridge that forms a seal between the interchange and the lower portion of the vacuum bottle.

20. The switchgear apparatus of claim 19, wherein the sleeve is compressed between the first terminal and the upper portion of the vacuum bottle.

* * * * *